United States Patent [19]
Stewart et al.

[11] Patent Number: 5,825,967
[45] Date of Patent: *Oct. 20, 1998

[54] VIDEO PROCESSING SYSTEM WITH RANDOW ACCESS FRAME STORE FOR VIDEO EDITING

[75] Inventors: Ian Malcolm Stewart, Ashmore Green; Timothy John Beckwith, Calcot, both of England

[73] Assignee: Ricoh Company, Ltd., Tokyo, Japan

[*] Notice: The term of this patent shall not extend beyond the expiration date of Pat. No. 5,649,046.

[21] Appl. No.: 804,893

[22] Filed: Feb. 24, 1997

Related U.S. Application Data

[63] Continuation of Ser. No. 162,445, Dec. 3, 1993, Pat. No. 5,649,046.

[30] Foreign Application Priority Data

Dec. 7, 1992 [GB] United Kingdom ................... 9225575
Aug. 10, 1993 [GB] United Kingdom ................... 9316626

[51] Int. Cl.$^6$ .............................. H04N 5/93; H04N 7/30
[52] U.S. Cl. ............................... 386/52; 386/54; 386/55; 386/109
[58] Field of Search ................................ 386/52, 54, 55, 386/56, 95, 96, 33; 348/571; 358/537; H04N 7/30, 5/93

[56] References Cited

U.S. PATENT DOCUMENTS

| | | | |
|---|---|---|---|
| 4,514,818 | 4/1985 | Walker | 348/571 |
| 4,602,286 | 7/1986 | Kellar et al. | 348/597 |
| 4,688,106 | 8/1987 | Kellar et al. | 358/342 |
| 4,951,040 | 8/1990 | McNeil et al. | 345/139 |
| 5,012,334 | 4/1991 | Etra | 386/52 |
| 5,101,364 | 3/1992 | Davenport et al. | 386/95 |
| 5,164,839 | 11/1992 | Lang | 386/101 |
| 5,191,436 | 3/1993 | Yonemitsu | 360/14.1 |
| 5,206,767 | 4/1993 | Heep | 386/52 |
| 5,233,438 | 8/1993 | Funahashi et al. | 386/97 |
| 5,239,419 | 8/1993 | Kim | 386/117 |
| 5,257,142 | 10/1993 | Hong | 386/96 |
| 5,333,061 | 7/1994 | Nakashima et al. | 386/96 |
| 5,649,046 | 7/1997 | Stewart et al. | 386/52 |

FOREIGN PATENT DOCUMENTS

| | | | |
|---|---|---|---|
| 0387981 | 9/1990 | European Pat. Off. | H04N 5/262 |
| 0396415 | 11/1990 | European Pat. Off. | H04N 5/262 |

(List continued on next page.)

OTHER PUBLICATIONS

Patent Abstracts of Japan, JP1–186059, Jul. 25, 1989.
Patent Abstracts of Japan, JP2–103666, Apr. 16, 1990.
Pank, B., "New Technology in Still Stores—What Are The Implications?", vol. 101, No. 8, Aug. 1992, pp. 550–552.
Heitmann, J.K.R., "Development of Component Digital VTRs and the Potential of the D–1 Format", vol. 97, No. 2, Feb. 1988, pp. 126–129.

Primary Examiner—Tommy P. Chin
Assistant Examiner—Vu Le
Attorney, Agent, or Firm—Cooper & Dunham LLP

[57] ABSTRACT

A video processing system 1 comprises a video tape recorder 2 which serves as a bulk store for storing video clips, a video disc store for storing video data relating to one or more video clips from the recorder 2 and an image processor 6 for processing video data from the video store 7 to produce an edited video clip. Set-up data identifying video frame locations and defining the manner in which the processor 6 processes data from the video store 7 to produce the edited video clip is stored in an editing memory 12. During or after editing, data can be archived for future use. The system 1 further comprises a magneto-optical disc store 35 for storing the set-up data from the editing memory 12. For the purpose of archiving, the video tape and an associated magneto-optical disc are assigned a common archive identity. Each frame of data from the video disc store 7 used in an edit is stored only once on the video tape and set-up data for the edit is stored on the associated magneto-optical disc. This minimises the amount of data that needs to be saved in and retrieved from the archived tape.

19 Claims, 4 Drawing Sheets

FOREIGN PATENT DOCUMENTS

| | | |
|---|---|---|
| 0438299 | 7/1991 | European Pat. Off. ...... G11B 27/034 |
| 2089625 | 6/1982 | United Kingdom . |
| 2113950 | 10/1983 | United Kingdom ............. H04N 5/22 |
| 2235815 | 3/1991 | United Kingdom .......... G11B 27/028 |
| 92 055037 | 3/1992 | United Kingdom . |
| 92 261999 | 12/1992 | United Kingdom . |
| 93 120392 | 6/1993 | United Kingdom . |
| 9110321 | 7/1991 | WIPO .............................. H04N 5/76 |

VIDEO PROCESSING SYSTEM WITH RANDOW ACCESS FRAME STORE FOR VIDEO EDITING

This is a continuation of application Ser. No. 08/162,445 filed Dec. 3, 1993, now U.S. Pat. No. 5,649,046.

The invention relates to a video processing system.

Electronic video processing or editing systems are used for example in television or film post production to modify video or film clips. The modifications which may be effected using such systems include the insertion of a first or foreground clip into a second or background clip either using a colour matte in one of the clips or using a separate control image or stencil. Such systems can also be used to retouch one or more frames in a clip, to correct colours or to add texture to selected areas in the or each frame.

Hitherto known editing systems vary from manufacturer to manufacturer but generally comprise at least two video sources, for example video tape recorders (VTRS) whose outputs are connected to a vision mixer and which together with the vision mixer are controlled by an electronic edit controller. The system further comprises a monitor and-during editing modified images are displayed thereon so that the user can see immediately the result of his modifications.

The system can be used to combine video clips from the two sources, which clips may be modified as described hereinabove prior to being combined. One way in which the clips may be combined is simply to join or splice one clip to the end of the other or to splice one clip or a portion of that clip into the middle of the other clip. In this mode of operation the edit controller is made responsive to an edit decision list which identifies the location of each clip in the two sources by for example its start frame and end frame, the number of frames in the clip and where appropriate the frames between which a splice is to be made. A more sophisticated operation which may also be performed by the system is that of combining two clips by dissolving between the two clips. In a dissolving operation the edit decision list includes data identifying the number of frames in a dissolve. In response thereto the edit controller controls the mixer to combine corresponding frames in the two clips, for example in a weighted summing of the frame data. During this mode of operation frames from the source may be modified by an effects unit before being passed to the vision mixer.

One disadvantage of such systems is that VTRs are sequential access devices and cannot simultaneously playback and record different video clips. This means that a separate VTR is required as a source for each video clip to be worked on and at least one further VTR is required to record the video output from the mixer.

Assignee has until recently manufactured and sold an editing system under the trade mark "HARRY". In the HARRY system frames forming a video clip are digitally encoded and stored in parallel transfer disc stores. As is disclosed in commonly owned U.S. Pat. No. 4,688,106, the teachings of which are incorporated herein by reference, the video clips are read out of the disc stores in parallel. While this arrangement provides greater flexibility by effectively allowing random access to the frames that constitute a clip, it nevertheless requires separate disc stores for each of the video clips.

The HARRY system has recently been replaced by a new processing and editing system which is currently sold under the trade mark "HENRY". The principles behind the HENRY system are described in detail in commonly owned co-pending U.S. patent application Ser. No. 08/030,823 filed Mar. 12, 1993 (corresponding to British Patent Application No. 9205503.7), the teachings of which are incorporated herein by reference. The HENRY system comprises among other things a store having several disc drives for storing multiple video frames in random access order. The store also is arranged to enable data to be transferred therefrom at video rate. This allows the system to operate in a preview mode in which video clips are read from the store modified and/or combined and displayed on a monitor at video rate without the need to commit the modification or combination to the store beforehand. Further features of the HENRY editing system include the displaying of multiple clips with selected clips being arranged on the display in the form of a pack of clips, that is to say two or more video clips which provide background and foreground images when combined in a video clip and which can be manipulated like a pack of cards so as to change the order in which the images are laid onto one another. The system assigns a priority to each of the clips in the pack according to its position therein and the priority is used subsequently in the combining of the clips. In addition to simple splice and stick operations by which two or more clips are combined, the HENRY system is able to combine two clips by dissolving from one to the other over several frames.

A problem that can occur when using electronic video processing or editing systems is related to the fact that a large number of output frames can be created quickly as several clips are combined. In itself this is not a problem but problems can occur after the newly created combined clip has been transferred to a VTR or other storage device. Sometimes the newly created clip is of such a length that it is not possible to load all of the data representing the clip back into the disc store. This may occur for example when the new clip is formed by repeating several times one or more portions of one or more of the clips initially input to the system.

The present invention aims to provide an improved video processing system which overcomes or at least reduces some of the abovementioned and associated problems.

According to one aspect of the invention there is provided a video processing system in which video data stored in a bulk store and representing one or more initial video clips comprising a plurality of video frames is readable from the bulk store to a random access frame store for frame selection and modification by a processor to produce video data representing a new video clip comprising one or more new frames, the processor during said selection and modification producing set-up data which defines the manner in which video data for the new video clip is created by the processor from video data representing one or more selected frames in the one ore more initial video clips, the video data for the new video clip once created being storable in the bulk store, and the system being arranged such that the set-up data is stored in association with the video data for the new video clip thereby enabling the video data representing each selected initial frame of the initial video clip to be stored once only as the video data for the new video clip.

The above and further features of the invention are set forth with particularity in the appended claims and together with advantages thereof will become clearer from consideration of the following detailed description of an exemplary embodiment of the invention given with reference to the accompanying drawings.

Figure 1:
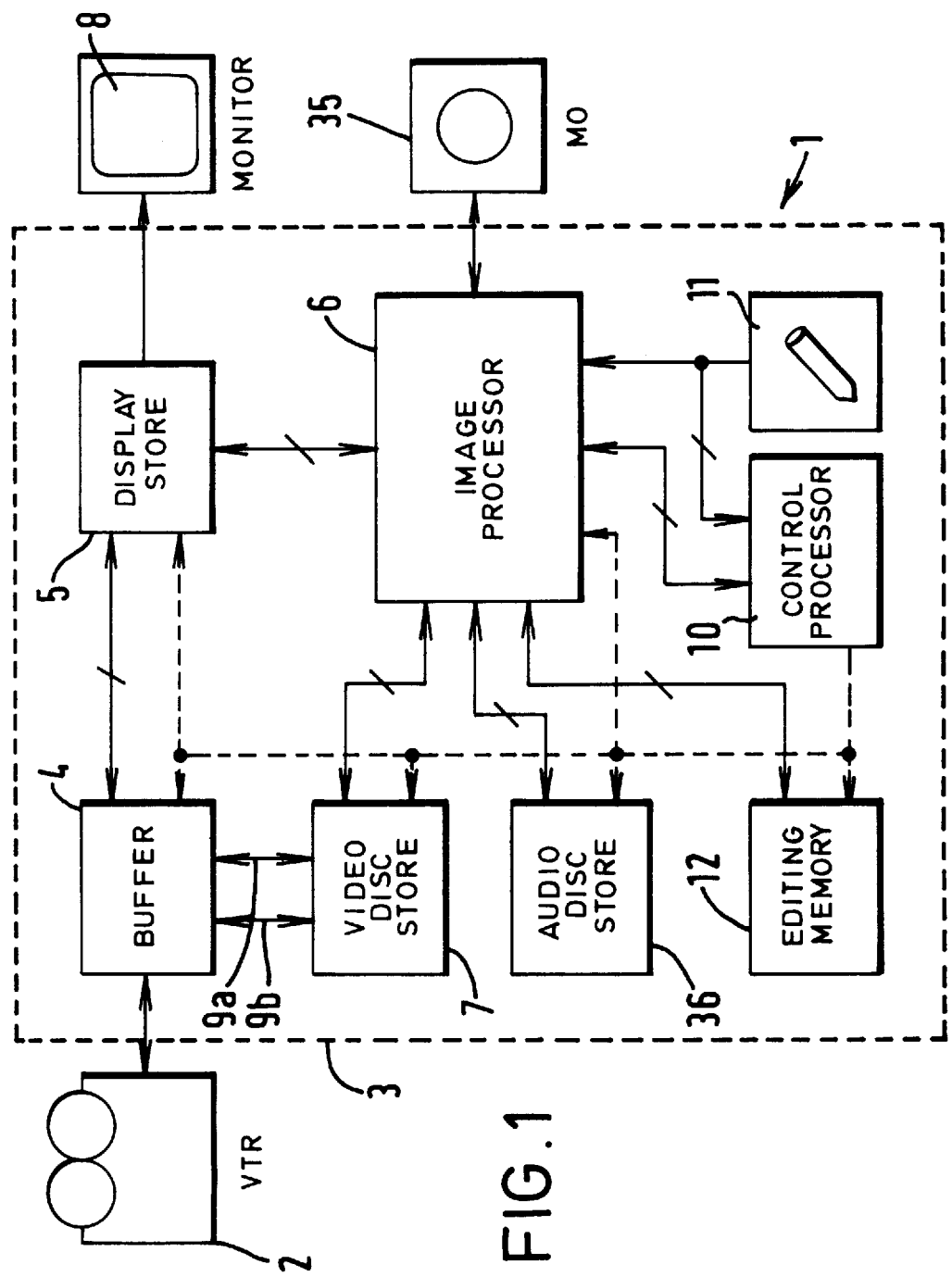
FIG. 1 is a schematic block diagram of a first system embodying the invention.

Turning now to FIG. 1 of the accompanying drawings there is shown a video processing system 1 comprising a video tape recorder (VTR) 2 which is used in the transfer of video clips between video tape (not shown) and an editing system 3, such as the abovementioned HENRY editing system. Video tape is used to form a bulk off-line store or library of video clips and the VTR 2 provides a means by which archived video clips can be retrieved from the library for use in the editing system 3. Of course, the VTR 2 also provides a means by which a new video clip created in the editing system 3 can be archived onto video tape for later use either in the same or a different system. Thus, the VTR 2 serves as a bulk store for several video clips. Video data representing each video clip is stored on video tape in a non-compressed digital component format, for example a format corresponding to the so-called D1 standard.

The editing system 3 comprises a buffer 4 which is connected to the VTR 2 via a data path having sufficient bandwidth to enable data relating to at least one video clip to be transferred thereover at video rate (e.g. 27 MHz for a full colour picture). The buffer 4 is also connected both to a display store 5 an image processor 6 and to a video disc store 7. The buffer 4 provides an interface between the VTR 2 and the display store 5, the processor 6 and the video disc store 7. The buffer 4 is used to transfer incoming video clip data from the VTR 2 via two bidirectional buses 9a, 9b to the video disc store 7 and at the same time to transfer the incoming data to the display store 5 for display on a monitor 8 connected thereto. This enables an incoming video clip from the VTR 2 to be previewed on the monitor 8 by the user as it is loaded into the video disc store 7.

The display store 5 provides for the processor 6 a large scratch pad store for storing data relating to several frames of video. The image processor 6 processes the frame data therein to produce respective frames of reduced size for concurrent display at different portions of the monitor 6, as described in greater detail in commonly owned aforementioned U.S. patent application Ser. No. 08/030,823. The processor 6 is able to control the output of one piece of video from the display store 5 simultaneously to several different places on the monitor or to output several pieces of video to a common area on the monitor 8. Thus, the processor 6 is able to present video clips on the monitor 8 in several different ways for manipulation and modification by the user of-the system. The image processor 6 comprises two separate processing units (not shown) for producing simultaneously images of reduced size from data supplied via the buffer 4. A video clip may be read out from the video store 7 and written directly to the display store 5 or alternatively, video clips may be transferred directly from the bulk storage of the VTR 2 via the buffer 4 to the display store 5.

The video disc store 7 is preferably similar either to that described in commonly owned abovementioned U.S. patent application Ser. No. 08/030,823 or that described in commonly owned and concurrently filed U.S. patent application Ser. No. 08/804,893 now U.S. Pat. No. 5,765,186 (Attorney Docket No. 2098/44988) (corresponding to British Patent Application No. 9226199.9) and thus comprises several disc store devices (not shown) in parallel interfaced to the two bidirectional data paths, shown schematically in FIG. 1 as the buses 9a and 9b, each capable of conveying video clips at video rate. The disc store devices have a relatively high storage capacity for such devices. The video disc store 7 is therefore able to store several minutes of video for processing by the editing system 3 and to output and/or receive simultaneously two video clips at video rate for editing and other modifications.

The editing system 3 comprises a control processor 10 which is connected to the buffer 4, the display store 5, the image processor 6, and the video disc store 7. The control processor 10 controls the modifications and processing applied to the video clip data by the image processor 6. Control paths from the control processor 10 are shown as broken lines in the drawing. During editing the control processor 10 controls the transfer of video clip data from the buffer 4 to the display store 5 such that several frames from each clip are caused to be displayed simultaneously at different or overlapping or shared portions of the monitor 8 as is described in detail in commonly owned co-pending U.S. patent application Ser. No. 08/030,823. The control processor 10 also controls the image processor 6 so that it performs desired operations and effects functions on selected frames in the video clips including the generation of keying signal, modification of colour, changing of texture, or spatial effects such as changes of size, position and/or spin. These operations and effects are per se well known and require no further explanation herein.

The selection and modification of video clips and frames within the clips is controlled by a user manipulatable stylus and touch table device 11 which can be used to select any one of a number of predefined functions presented in a menu (not shown) displayed on a portion of the monitor 8.

An editing memory 12 is provided for storing data which identifies selections and modifications made by the user to video clips, parts of video clips and individual frames from the clips during editing. Data for each frame from a video tape has associated with it a time code which uniquely identifies the frame on the tape and a tape number. When a clip is transferred from the VTR 2 to the editing system 3 the corresponding frame identifying data is simultaneously transferred under the control of the control processor 10 to an area in the editing memory 12. The control processor 10 also receives data from the video disc store 7 identifying the locations therein at which each frame is stored and this data also is transferred to the editing memory for storage therein. This data facilitates user selection of specific frames for editing and also the efficient transfer of data around the system during editing. Another area of the editing memory 12 is used to store data defining the way in which frames are to be modified or combined in order to achieve a desired edit. The data in the editing memory 12 shall be referred to hereinafter as set-up data because it defines how the image processor 6 must be set up, e.g. to combine two frames or change a characteristic in one frame, in order to achieve the desired edit. Further explanation of the set-up data shall be given in the following- by reference to specific examples which should not be construed to be in any way limiting.

Figure 2:
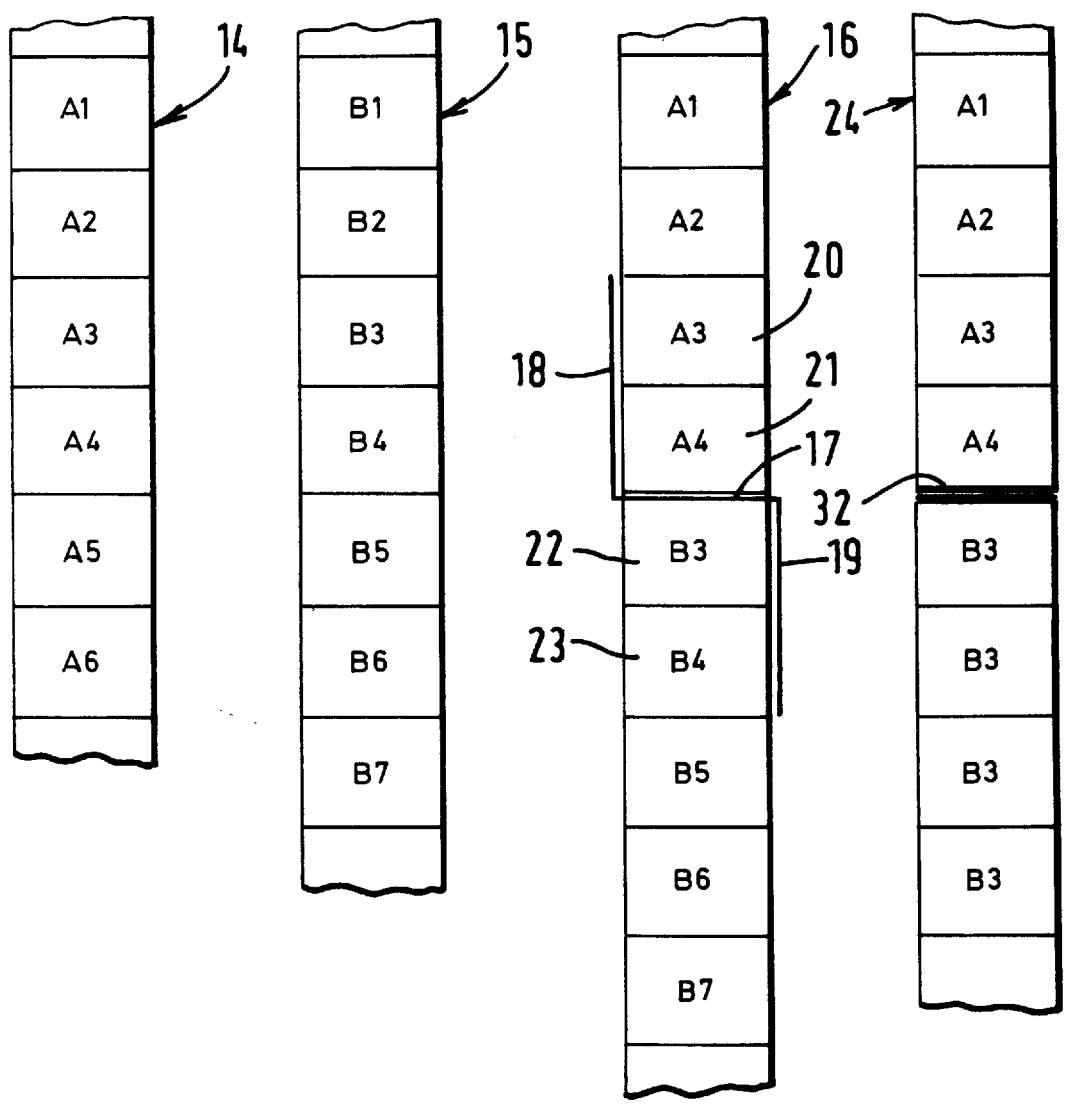
FIG. 2 shows initial video clips and edited clips created therefrom using the system of FIG. 1.

Referring to FIG. 2 of the accompanying drawings a first initial video clip 14 comprises several image frames A1 to A6 and a second initial video clip 15 comprises several image frames B1 to B7. The term "initial" is used herein to refer to video clips which have been read from the VTR 2 to the disc store 7 and which have not been altered during the present editing operation. The clips may never have been edited or they may have been edited or otherwise processed using different equipment at some time in the past. Data representing the first and second initial video clips 14, 15 is loaded from the bulk store VTR 2 to the video disc store 7. Data representing further clips may also be stored in the video disc store 7 but for the purpose of simplifying the following explanation it will be assumed that only the first and second initial clips are stored in the video disc store 7. Selected frames of the two or more clips stored in the video store 7 can then be transferred to the image processor 6 for processing and to the display store 5 for display on the monitor 8. Since the video store 7 is effectively a random access frame store, the system can be made to display any frame from any clip or combination of frames and clips in any order and at any position on the monitor 8 without the need for the user to commit irretrievably to a particular displayed combination until such time as he is entirely happy with the result as displayed on the monitor.

Once the desired clip or clips have been loaded into the video store 7 and selected frames therein displayed on the monitor 8 the user can edit the clips. Cut and insert editing, i.e. video splicing, is achieved by displaying at least a portion of each clip including the point at which each clip is to be cut in order to enable the part to be identified. For example, if an edited clip was to be produced comprising frames A1 to A4 of the first clip 14 and frames B3 to B7 of the second clip 15, then the system would be arranged to display at least a portion of both frame A4 and frame A5 of the first video clip 14 in one area of the monitor 8 and at least a portion of frames B2 and B3 of the second video clip 15 in another area of the monitor 8. Once displayed the images can be manipulated as described in commonly owned co-pending U.S. application Ser. No. 08/030,823 to produce the edited, spliced clip 16 comprising frames A1 to A4 of the first clip 14 and frames B3 to B7 of the second clip 15. This cut and insert operation occurs entirely within the image processor 6 with, of course, corresponding adjustments to the data in the display store 5 and there is no corresponding change to any of the clip data held in the video store 7. Instead, the set up data that defines the manner in which the splice is created from the two initial clips is stored in the editing memory 12. Accordingly, the data representing frames A5 to A6 of the first initial clip 14 and representing frames B1 to B2 of the second initial clip 15 remain available for further processing if required. (Of course, this is also true of frames A1 to A4 and B3 to B7). This availability of frames is indicated on the monitor 8 by a continuous line comprising a crossbar 17 which crosses the combined clip at the join between the first and second clips and connects between a pair of tails 18, 19 running parallel to the displayed clip. The length of each tail 18, 19 represents the number of available frames in the respective first or second clip. Thus the tail 18 indicates that the last two frames A5, A6 of the first clip 14 do not form part of the combined clip 16, and the tail 19 indicates that the first two frames B1, B2 of the second clip 15 do not form part of the combined clip 16.

In addition to splicing two clips together the processor 6 is able to dissolve between the two clips over a selected number of frames. In a procedure similar to that already discussed hereinabove the first and last frames of two video clips are identified on the monitor 8 and the two clips are spliced together by manipulation of the stylus on the touch tablet.

A dissolve is then set over a selected number of frames, by further manipulation of the stylus. During this mode of operation a menu (not shown) is displayed on the monitor thereby enabling the user to enter data about the dissolve including its length and whether the dissolve starts at the splice point as represented by the crossbar 17, finishes at the splice point, or is centred or otherwise positioned about the splice point. Hidden frames that contribute to the dissolve are represented by respective portions of the tails 18, 19.

Thus, in a dissolve operation in clip 16 the tail 18 indicates that frames 20 and 21 include respective contributions from frames B1 and B2 of the second initial clip 15 and the tail 19 indicates that frames 22 and 23 in clip 16 include respective contributions from frames A5 and A6 of the first initial clip 14. Again, there is no actual change in the data stored in the video store 7 at this stage, the only change being the creation of set-up data representing the dissolve stored in the editing memory 12.

A variation on the cut and insert and the dissolve splicing is the replication of a clip, a portion of a clip or an individual frame from a clip. An example of frame replication is shown as clip 24 in FIG. 2. As shown in FIG. 2 the clip 24 comprises frames A1 to A4 of initial clip 14 and frame B3 of initial clip 15 repeated four times. Again, the video data in the video disc store is not changed but new set up data defining the clip 24 is stored in the editing memory.

In addition to the above-discussed splicing operations the system has the ability to key together two or more clips on a frame by frame basis under the control of a control or keying image, also known as a stencil, or using a color matte generated automatically from the picture in one of the initial clips. The keying technique used on a frame by frame basis during such an operation is preferably similar to that disclosed in commonly owned British patent application published as GB-A-2113950 and corresponding U.S. Pat. No. 4,602,286, the teachings of which are incorporated herein by reference. In the situation where a control image is used, the control image may be created by the user on a frame by frame basis by manipulation of the stylus and touch tablet device. A method of painting, by which the control image may be created, is disclosed in commonly owned British patent application published as GB-A-2089625 and corresponding U.S. Pat. No. 4,514,818, the teachings of which are incorporated herein by reference. When a control image is created in this way each frame, once completed, is stored in the video store 7. Alternatively, the control image, which is in itself a monochrome video clip, may be created in another machine or in the same machine at an earlier time and be supplied together with the initial clips 14, 15 from the VTR.

When two clips are combined in this way one of the initial clips may be regarded as the background and the other clip regarded as the foreground or insert in the new image. It is often desirable to be able to change the perspective or position of the insert image or a portion thereof so that it matches features in the background clip. Commonly owned European patent application published as EP-A-283159 and corresponding U.S. Pat. No. 4,951,040, the teachings of which are incorporated herein by reference, discloses a method which is used by the processor 6 to effect shift and spin transformations to the foreground image. Again, when such transformations are applied to frames in one or other, or indeed both, of the initial clips 14, 15 no changes are made to the data held in the video store 7 but instead corresponding set-up data is stored in the editing memory 12.

New image frames may also be created by retouching or painting individual frames in the initial clips 14, 16, the painting method employed again preferably being that disclosed in U.S. Pat. No. 4,514,818. Other effects such as feature changes may also be applied to selected frames. Data representing each newly painted frame, like the data for newly created stencils, is also stored in the video disc store 7.

Thus, it will be appreciated that the system 1 provides the user with a comprehensive range of facilities by which video clips can be modified and edited to create a new video clip.

During the modification and editing very few, if any, new frames will actually be stored as new frame data in the video disc store 7 but a large record of set-up data is stored and defines entirely the modifications and edits to be applied to the initial video clips to create the new clip. The user is free to review any part of the new clip at any time and to alter modifications or edits further should he so wish.

Figure 3:
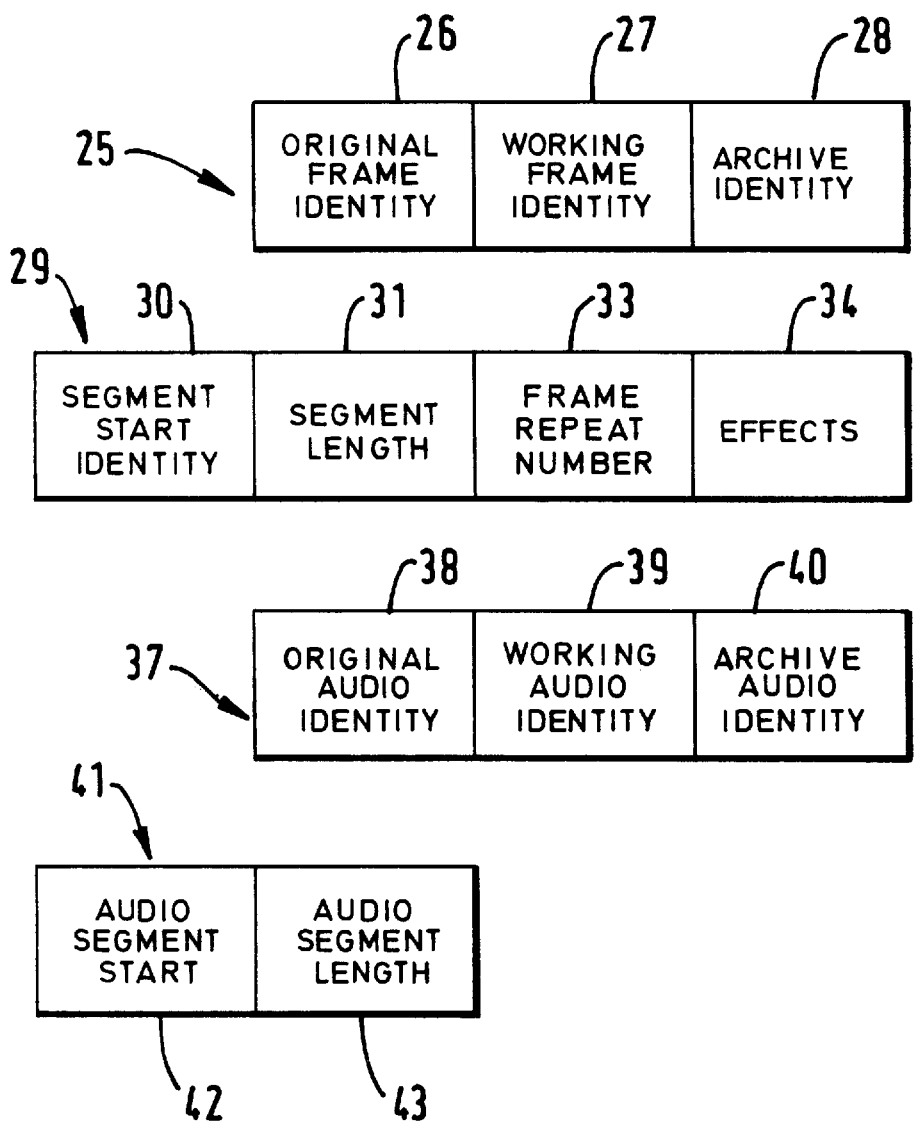
FIG. 3 shows set-up data produced and used by the system in the production of the edited clips.

FIG. 3 of the accompanying drawings shows several fields of set-up data which are produced and used by the system in the production of the edited clips. As previously mentioned herein, when image frames are read from video tape by the VTR 2 to the video disc store 7 the image data for each frame is accompanied by data which uniquely identifies the frame in terms of time and/or a number, both of which corresponds to its position in the clip on the tape. The transfer of a clip from the VTR to the video disc store 7 is supervised by the control processor 10 which extracts from the incoming data the original frame time/number data and stores it as part of an identity field 25 as original frame identity data 26 in an area of the editing memory 12. As the image frames are stored in the disc store 7 each frame is assigned a working frame identity which enables the user of the system 3 to identify a frame or frames in the clip and enables the system quickly to access it in the video store 7. This working frame identity data 27 is also stored in the identity field 25 against respective original frame identity data 26. The working frame identity data 27 identifies each frame in the disc store 7 in terms of both time and number corresponding to the position of the frame in the clip as held in the store 7. During editing the working frame identity number can be changed by the user to any arbitrary value, for example the position of the frame in the final edited clip.

The identity field also includes archive identity data 28 which identifies a video tape on which the video clip has been archived. When an initial video clip is first brought to the system 1 it is stored on normal (non-archive) video tape and as the frames of the clip are loaded from the tape into the video store 7 a null value is assigned to the frames as their archive identity data 28. If, however, the clip has previously been edited in the system 1 and archived onto archive tape (as will be explained in greater detail hereinafter) the incoming clip data will include data which identifies the archive tape. The control processor 10 then extracts the archive frame identity data from the incoming data and compares it together with the original frame identity data on a frame-by-frame basis with any identity data that may already be held in the editing memory 12. If the incoming identity data matches any identity data already stored in the editing memory 12 then this signifies that the data for that frame is already stored in the video disc store 7 and need not be stored therein again. Otherwise the incoming video data is stored in the disc store 7 and the identity data in the memory 12.

Data representing user selected modifications and edits is created by the processor 10 and stored in the editing memory 12 as a video set-up field 29. The video set-up field 29 contains segment start identity data 30 which identifies the frame of an initial clip at which the next segment in the edited clip starts. Thus for example in FIG. 2 at the edit point 17 in clip 16 the segment start identity data 30 would identify frame B3 as the starting frame for the next segment of clip 16. The set-up field 28 also contains segment length data 31 which identifies the number of initial frames making up the next segment. Thus, for example in FIG. 2 the segment after the edit point 17 is five frames long (frames B3 to B7) and this information is stored as the segment length data 31. Each segment can be of any length from one frame upwards. In clip 24 of FIG. 2 the segment after the edit point 32 starts at frame B3, is one frame long (i.e. frame B3) and the one frame B3 repeats four times. The fact that the frame B3 repeats four times is stored as frame repeat number data 33 in the video set up field 29. In the case of a segment where two or more initial clips are combined the segment length data 31 identifies the number of frames in the background clip. The set-up field 29 also contains effects data 34 relating to effects or modifications applied to each segment of the edited clip, e.g. clip 16. In clip 16 the effects data 34 would identify frames comprising the tails 18 and 19. In other segments (not shown) the effects data could identify such things as parameters defining spatial transformations (shift and spin), the identity of key or stencil for use in combining clips, data defining colour or texture changes, and any other data which is used by the processor to define a user selected edit or modification.

Once an edited clip acceptable to the user has been created all of the image data in the video disc store, and this includes the initial frame data, data representing the newly painted frames, and control image data, is made available for transfer to the VTR 2 for storage on an archive video tape. An archive video tape is a tape which forms part of a video tape library or archive and has assigned to it a code which identifies it uniquely within the archive. The identity data is prerecorded onto the tape before the video data is recorded on the tape.

It is not always necessary to transfer all of the image data from the video disc store 7 to the archive tape. During the transfer of a clip from the disc store 7 to the VTR 2 the control processor 7 compares for each frame the archive identity data 26 in the identity field 25 in the editing memory 12 with the archive identity of the tape currently in the VTR 2. If a frame has been newly created in the system 1 or has been loaded into the system from a non-archive video tape then the archive identity data of the frame will have a null value indicating that it has not previously been archived. The video data for that frame is therefore output to the VTR 2 to be recorded onto the archive tape. Similarly, if the archive identity data 26 differs from the identity of the tape currently in the VTR 2, then this indicates that the frame data has not been recorded onto the current tape. The video data for that frame is therefore output to the VTR to be recorded onto the tape. However, if the archive identity data 26 matches the identity of the tape currently in the VTR 2, then this indicates that the frame data has already been recorded onto the tape. There is no need to archive the data for such a frame, and it therefore is not recorded onto the tape.

Thus, the frames in the video disc store are recorded onto the archive tape in the order in which they appear in the disc store 7, subject to each frame being stored only once on the archive tape. Thus, for example in clip 24 of FIG. 2 frames A1 to A4 would be recorded onto the tape followed by one recording only of the frame B3.

Each archive video tape has a corresponding archive magneto-optical disc which is used to store, among other things, the data from the video set-up field 29 from the memory 12. The system 1 therefore further comprises a magneto-optical disc drive (MO) 35 for storage of the set-up data for the newly created clip on a magneto-optical disc (not shown) or other suitable high capacity transportable storage medium that can be associated with the archive tape from the VTR 2 during storage of the tape away from the VTR 2. It will, of course, be appreciated that the set-up data for an edited clip will comprise a long list of set-up data fields 28, one for each segment of the edited clip.

Each video clip on a video tape may have a corresponding sound track. The use of D1 or a similar non-compressed digital format by the VTR makes it difficult to record audio onto video tape in such a way that there is a one-to-one relationship between a video frame and its associated portion of the audio soundtrack (referred to hereinafter as an audio frame). Therefore, data representing audio frames is not recorded onto the video tape by the VTR 2 but is instead recorded by the MO 35 to the archive disc associated with the archive tape.

At the same time as video data is loaded into the video disc store 7 from the VTR 2 audio data is loaded from the MO 35 into an audio disc store 36 under the control of processor 10. Like the video frames, each audio frame has respective identity data which is created and/or stored during editing as an audio identity field 37 in the editing memory 12. The audio identity field 37 comprises original audio frame identity data 38 which identifies the audio frame in terms of its position (time and number) in the original audio clip, and working audio frame identity data 39 which identifies each frame in the audio disc store 36 in terms of both time and number corresponding to the position of the frame in, say, the final edited clip. The audio identity field also comprises archive audio identity data 40 which identifies the MO on which the audio frame is recorded (if any).

Set-up data which identifies the order in which audio frames are to be played during an edited clip is also created and stored in the editing memory 12. As shown in FIG. 3 of the accompanying drawings the audio set-up data occupies an audio set-up field 41 which is separate from the video set-up field 29. The audio field 41 comprises audio segment start data 42 which, like the video segment start identity data 30, identifies the audio frame at which the audio segment starts. The audio field 41 also comprises segment length data 43 which, like the video segment length data 31, identifies the length of the audio segment in terms of a number of audio frames. Each audio frame will have a duration of 1/25 or 1/30 second depending on the display standard used, e.g. PAL or NTSC respectively. Playing a single audio frame repeatedly produces a sound which is meaningless. The audio field 41 therefore does not include data corresponding to the frame repeat number 33 in the video field 29. Normally the user will select an audio segment to be played during the repeated display of a single video frame and data for the selected audio is of course stored as an audio data field at the appropriate position in an audio data field list corresponding to the video data field list. When the edit is complete the thus created audio data field list is transferred to the MO 35 for storage with the stored audio frames on the archive magneto-optical disc associated with the archive video tape.

The system 1 thus provides a facility in which an edited clip can be saved economically on a video tape and associated disc. This enables intermediate work to be saved for later re-inputting to the editing system 3, for example at the end of the day or as a back-up copy as a precautionary measure as insurance against a power failure or the like. Unlike previously available systems, when the stored edited clip is written back into the video disc store 7 only each contributing initial frame is written thereto, and then only once. It will be appreciated that this approach of storing each frame only once, regardless of the number of times that a frame contributes to the edited clip, can result in a significant saving in the amount of data stored.

Video tape is an ideal medium for storing a video clip of considerable duration, for example up to 90 minutes in length. One disadvantage of storing video on tape is that it takes time to wind the tape forward or backward to the location thereon of a desired video frame. This winding time can introduce an unacceptable delay in the retrieval of data from distant parts of the tape during the loading of video data to the video disc store 7. In response to a suitable command from the user, the control processor 10 is arranged to ignore the fact that data for a frame or clip is already stored earlier on the tape and to record again the data on the tape in order to speed up subsequent retrieval of data for further editing.

If the edited clip as stored on tape were to be read therefrom directly for display it would not appear correctly on the display since not all the final frames in the edited clip will be on the tape. Therefore, the system 1 is arranged such that once the user has finally completed an edit the frames (video and audio) in the edited clip are created in accordance with the set-up data and output to the VTR 2 for final recording on a video tape which may or may not form part of an archive of tapes. During this final composition of the edited clip the user may choose to read the originally recorded initial video clips from the original (non-archive) tape, rather than a later copy of the clips created at an earlier intermediate stage when data was temporarily transferred from the disc store 7 to archive tape. The presence of the identity data field 25 in the editing memory 12 enables the system 1 to retrieve the originally recorded clips from the original tape.

The data in the editing memory 12 may be converted from the above described form into the form of a conventional editing decision list (EDL) so that the same edited clip can be created on different, and simpler editing equipment not having the above described facilities.

The above described system 1 is intended for incorporation in the HENRY processing and editing system. As previously mentioned herein, the HENRY system comprises a store comprising several disc drives for storing multiple video frames in random access order. As presently sold the store in the HENRY system has sufficient capacity to store approximately fifteen minutes of video corresponding to about 30,000 full video frames which can be accessed in any random order. Such a flexible store enables the HENRY system to be used as part of a so-called on-line editing facility since the video output from the system is of broadcast quality and therefore can be immediately encoded for transmission without the need for any further image processing.

In general electronic image stores are not inexpensive. For this reason the high capacity frame random access store supplied with the HENRY system accounts for a considerable portion of the total price of the system. On-line editing is not always required. For example an editor may wish simply to preview video rushes (i.e. unprocessed video clips) in order to make editing decisions, such as shotlisting and cut/dissolve decisions. This can be done using a cheaper off-line facility. Hitherto known off-line facilities have been restricted to just shotlisting and basic cut/dissolve decisions which leave the editor in a position where a lot of time is still necessarily spent making decisions when subsequently using the on-line facility. In-order to overcome this limitation we are proposing to offer an off-line system which has all the editing features of our HENRY system but is provided with a much smaller store thereby enabling a significant cost saving to be had.

Figure 4:
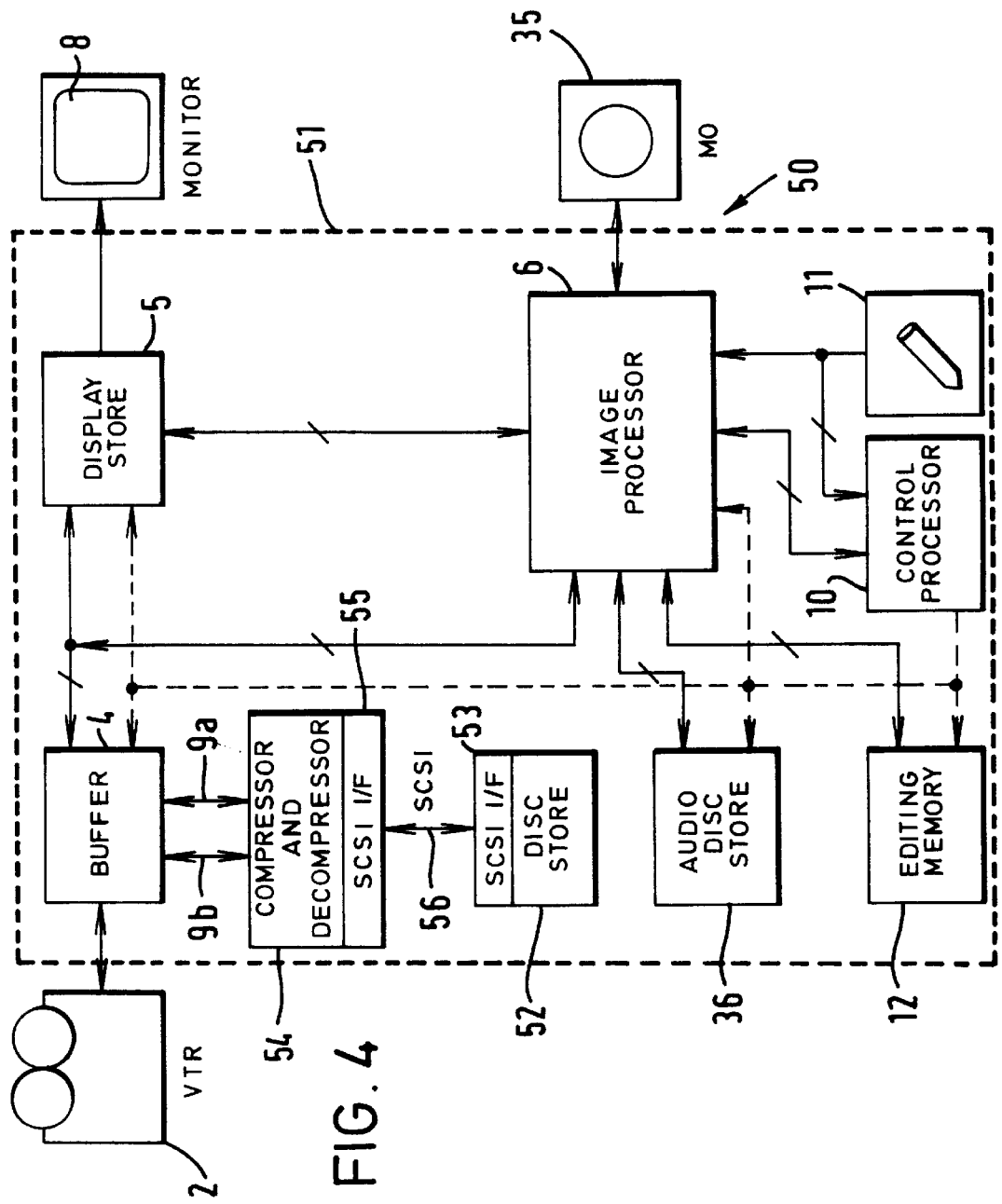
FIG. 4 is a schematic block diagram of a second system embodying the invention.

A video processing system 50 embodying the invention and including an off-line editing system 51 is shown in FIG. 4 of the accompanying drawings. Many of the functional units shown in FIG. 4 correspond exactly with the same units shown in FIG. 1. Such units are identified in FIG. 4 by the same reference numbers used in FIG. 1 and the following description is directed to the units in FIG. 4 which have not previously been described with reference to FIG. 1.

The off-line editing system 51 is provided with a disc store 52 comprising a disc storage device containing a disc drive and read/write circuitry for several platters (not shown). Such devices presently available are capable of storing around 520 MBytes (MB) of data and it is expected that equivalent devices capable of storing approximately 2500 MB of data will shortly be available. The disc store 52 includes a SCSI interface 53 for reasons which will be explained hereinbelow. Suitable disc stores with built-in SCSI interfaces are available from several different manufacturers.

Between the buffer 4 and the disc store 52 is a compression/decompression circuit 54, which may be any suitable known circuit for example the circuit described in commonly owned copending British Patent Application No. 9312039.2, a copy of which is attached hereto as Appendix A to this application and forms a part of this disclosure. Data compression of about 1/20 is acceptable in that it reduces significantly the required capacity to store the data without causing unacceptable picture degradation through generation losses. Using presently available technology, two disc storage devices in parallel provide sufficient capacity to store compressed data equivalent to approximately one hour of video. This represents considerable saving in storage costs. The compression/ decompression circuit 54 has an associated SCSI interface 55 which is connected to a SCSI bus 56 for transmission of compressed video data between the circuit 54 and the disc store 52. Uncompressed data is transmitted between the circuit 54 and the buffer 4 via the bidirectional highways 9a, 9b.

Unlike the system shown in FIG. 1, there is no direct path for control data from the control processor 10 to the disc store 52. Instead, control data identifying such things as frames required for display and/or processing is input via the buffer 4 and used to control the SCSI interfaces 53 and 55 in the transfer of compressed data to and from the disc store 52. The use of an established standard, namely SCSI, thus simplifies the controlling of data transfers to and from the disc store 52.

As with the system 1, video clip data from the VTR 2 is input to the buffer 4 for storage and subsequent editing. The incoming video clip data is compressed by the compressor 54 and stored in the disc store 52. When a video frame is required during editing, the data representing the frame is read from the disc store 52 via the SCSI bus 56 to the decompressor 54 where the data compression is reversed to produce a full data representation of the frame. The process of compression and decompression inevitably leads to some degradation in the image but compression techniques are now so good that the degradation is usually not noticeable by the untrained eye.

During editing the system 50 appears to the user to operate in the same way as the system 1. In fact the only real difference is that the system 50 operates on decompressed data which may become visible as unwanted artifacts if the data is subjected to several manipulations. Where several manipulations are applied, the data will be written to and from the disc store 52 resulting in visible degradation caused by cumulative generation losses. For this reason, we regard the system 50 to be an off-line facility, although if image quality is not of great importance or if only one or two manipulations are applied to the data the system 50 could, of course, be used on-line.

As with the system 1 data representing audio frames is recorded by the MO 35 to the archive magneto optical disc. Recording of the audio is the same as in the system 1 and there is therefore no degrading of the audio.

Once editing has been completed, the data defining the edit is transferred from the editing memory 12 to the MO 35 for storage on an archive magneto optical disc. Since the off-line system 50 is a variant of the on-line system 1, it is a simple matter to transfer the video rushes, together with the archive magneto optical disc, containing set up data and any new audio frames, and the associated archive video tape, containing any completely new frames created during off-line editing, to the on-line system 1 once off-line editing has been completed. Thus, the off-line system 50 allows cost effective editing experimentation with all decisions and set-ups being transferred directly to the more expensive on-line facility once the editor is confident of the results.

Having thus described the present invention by reference to preferred embodiments it is to be well understood that the embodiments in question are exemplary only and that modifications and variations such as will occur to those possessed of appropriate knowledge and skills may be made without departure from the spirit and scope of the invention as set forth in the appended claims and equivalents thereof.

We claim:

1. A video processing system in which digital video data stored in a bulk store and representing one or more initial video clips each comprising a plurality of video frames is readable from the bulk store to a random access frame store for frame selection and modification by a processor to produce for display video data representing a new video clip comprising one or more new frames, the processor during said selection and modification producing set-up data which identifies video frame locations and defines the manner in which video data for the new video clip is created by the processor from video data representing one or more selected frames in the one or more initial video clips, with the video data representing the clip for display being produced by said processor operating on the video data from the random access frame store representing said selected frames in accordance with said set-up data and the system being arranged such that the set-up data is stored in association with at least the initial video data necessary to produce the new video clip, thereby requiring the video data representing each selected initial frame of the initial video clips to be stored once only in the bulk store.

2. A video processing system as claimed in claim 1, wherein the bulk store comprises a video tape recorder and video data is stored thereby on a video tape.

3. A video processing system as claimed in claim 2, wherein the video data is stored on the video tape in a non-compressed digital component format.

4. A video processing system as claimed in claim 1, wherein the random access frame store comprises a multiplicity of disc stores, and video data stored in the random access frame store is distributed among the disc stores.

5. A video processing system as claimed in claim 1, wherein the random access frame store comprises a disc store, a data compressor for compressing the digital video data from the bulk store to produce compressed digital data for storage in the disc store, and a data decompressor for decompressing the data from the disc store.

6. A video processing system as claimed in claim 5, wherein the data compressor and data decompressor are connected to the disc store by a common control and image data bus and the processor is arranged during said frame selection and modification to select via said control and image data bus compressed data from said disc store.

7. A video processing system as claimed in claim 6, wherein the control and image data bus comprises a SCSI bus.

8. A video processing system as claimed in claim 1, wherein the processor has an associated memory in which said set-up data is stored.

9. A video processing system as claimed in claim 1, wherein the set-up data comprises data identifying uniquely the position in the bulk store at which each frame of the one or more video clips is stored.

10. A video processing system as claimed in claim 12, wherein the set-up data comprises data defining the number of times a frame in said initial video clip is repeated in said new video clip.

11. A video processing system as claimed in claim 1, wherein the set-up data comprises data identifying uniquely the bulk store in which the video data is stored.

12. A video processing system as claimed in claim 1, wherein the set-up data comprises data identifying at least a portion of the new video clip in terms of a starting frame in at least one of the one or more initial video clips.

13. A video processing system as claimed in claim 12, wherein the set-up data comprises data defining the length of said portion.

14. A video processing system as claimed in claim 12, wherein the set-up data comprises data defining the number of times a frame in said initial video clip is repeated in said new video clip.

15. A video processing system as claimed in claim 1, further comprising a storage device for storing said set-up data on a transportable medium.

16. A video processing system as claimed in claim 15, wherein said storage device comprises a magneto-optical disc drive and said transportable medium comprises a magneto-optical disc.

17. A video processing system as claimed in claim 1, wherein at least one of the initial video clips has an associated initial audio track divisible into a plurality of audio frames corresponding to respective video frames of said clip, a new audio track is producible by the processor from audio frames of the or each initial audio track, and the set-up data comprises data defining at least a portion of the new audio track in terms of a starting audio frame in at least one of the initial audio tracks.

18. A video processing system as claimed in claim 17, wherein the set-up data comprises data defining the length of said audio portion.

19. A video processing system as claimed in claim 1, further comprising a storage device for storing said set-up data on a transportable medium, wherein at least one of the initial video clips has an associated initial audio track divisible into a plurality of audio frames corresponding to respective video frames of said clip, a new audio track is producible by the processor from audio frames of the or each initial audio track, and the set-up data comprises data defining at least a portion of the new audio track in terms of a starting audio frame in at least one of the initial audio tracks, and wherein data defining the audio frames in the new audio track is stored On said transportable medium together with said starting audio frame data and said audio portion length data.

\* \* \* \* \*

UNITED STATES PATENT AND TRADEMARK OFFICE
CERTIFICATE OF CORRECTION

PATENT NO.   : 5,825,967
DATED        : October 20, 1998
INVENTOR(S)  : Ian Malcolm Stewart and Timothy John Beckwith It is certified that error appears in the above-identified patent and that said Letter Patent is hereby corrected as shown below:

Column 1, line 2 and
Cover page, item [54], please change "RANDOW" to --RANDOM--; and Signed and Sealed this Twenty-first Day of September, 1999

Attest:

Q. TODD DICKINSON

*Attesting Officer*     Acting Commissioner of Patents and Trademarks

UNITED STATES PATENT AND TRADEMARK OFFICE
CERTIFICATE OF CORRECTION

PATENT NO. : 5,825,967
DATED : October 20, 1998
INVENTOR(S) : Ian Malcolm Stewart and Timothy John Beckwith It is certified that error appears in the above-identified patent and that said Letter Patent is hereby corrected as shown below:

Title page, item [73], please change "Ricoh Company, Ltd., Tokyo, Japan" to --Quantel Limited, Newbury, England--.

Signed and Sealed this

Fifteenth Day of February, 2000

Q. TODD DICKINSON

*Attest:*

*Attesting Officer*  *Commissioner of Patents and Trademarks*